UNITED STATES PATENT OFFICE.

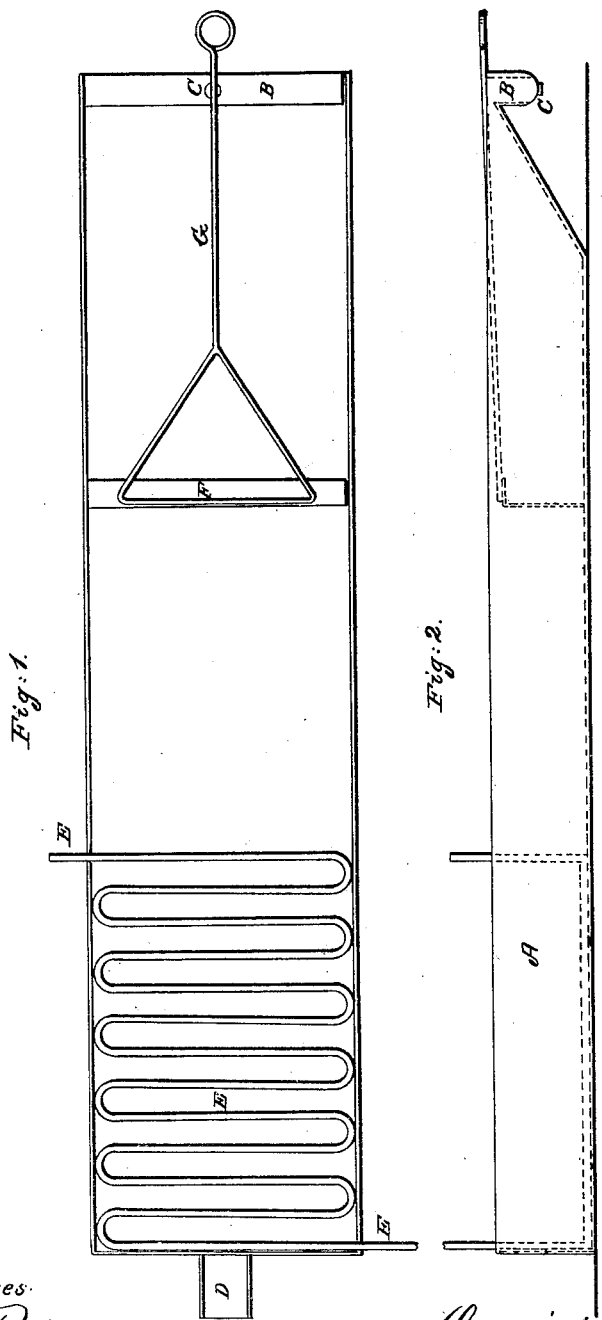

DAVID T. MILLER, OF DAYTON, OHIO.

IMPROVED SORGHUM-EVAPORATOR.

Specification forming part of Letters Patent No. 58,869, dated October 16, 1866.

*To all whom it may concern:*

Be it known that I, DAVID T. MILLER, of Dayton, in the county of Montgomery and State of Ohio, have invented a new and useful Improvement in Sorghum-Evaporators, of which the following is a full, clear, and exact description, reference being had to the annexed drawings, making a part of this specification, in which—

Figure 1 is a plan view of my evaporator, with its heating-coil and skimmer; and Fig. 2 is a side elevation, with the skimmer and heating-coil shown in dotted lines.

It is the object of my invention to create active ebullition in one portion of the evaporator, while the other portion is kept at a lower temperature, to cause a regular current in the liquid and keep the impurities on its surface; and to this end my invention consists in providing one portion of an evaporating-pan with a coil of pipes to receive a current of steam, and thus raise the temperature of the liquid to be evaporated in one portion of the pan to such a height as will produce active ebullition and cause the liquid to move in a current over the pan, and the impurities it may contain to rise to and remain on the surface, whence they can be skimmed into a receptacle in the front of the pan.

I construct a pan, A, of wood, metal, or other substance, in this example of a rectangular shape, (though the form is not material,) and of suitable depth to receive any quantity of juice which it is desired to evaporate at a single charge. This pan I call the "evaporator," and at one end it is provided with a trough, B, to receive the skimmings and convey them through the pipe C to any proper receiving-vessel. The opposite end of the evaporator is provided with a spout, D, to convey the juices to be reduced to the pan from the crushing-mill, or from any vessels that may be used to transfer it from the vat. A coil of metal pipe, E, is placed in the end of the pan, and may occupy about one-third of its area, through which a current of steam is to be passed when the evaporator is in operation. A skimmer, F, may be constructed as shown in the drawings, which represent a board, F, that will move freely within the evaporator, but reaching nearly from one side to the other, and furnished with a handle, G, by which the skimmer is wielded.

The operation is as follows: The evaporator being filled with juice, a current of steam at a high heat is passed through the coil of pipe in one part of the evaporator. This brings the juice into active ebullition over the coil, and induces a flow from its end of the evaporator on the top of the juice, and the current thus created returns to the coil in the lower portion of the pan from the cooler part, where there is no coil of heating-pipe. The impurities will rise to the surface and float in a scum, which can be skimmed by the attendant with ease into the receiving-trough, and all the impurities will be removed by the skimmer before the juice is reduced to the consistency desired in the sirup.

While my invention is of peculiar utility in reducing sorghum-juice to sirup, it will also be found effective in reducing other saccharine juices.

What I claim as my invention, and desire to secure by Letters Patent, is—

The evaporator constructed, arranged, and operating substantially as and for the purpose set forth.

In testimony whereof I have hereunto subscribed my name.

D. T. MILLER.

Witnesses:
H. B. CHANDLER,
FREDERICK S. SAGE.